Sept. 23, 1958  J. A. KANTHACK  2,853,106
CUT THROUGH PORTABLE HANDSAW
Filed May 27, 1957  2 Sheets-Sheet 2

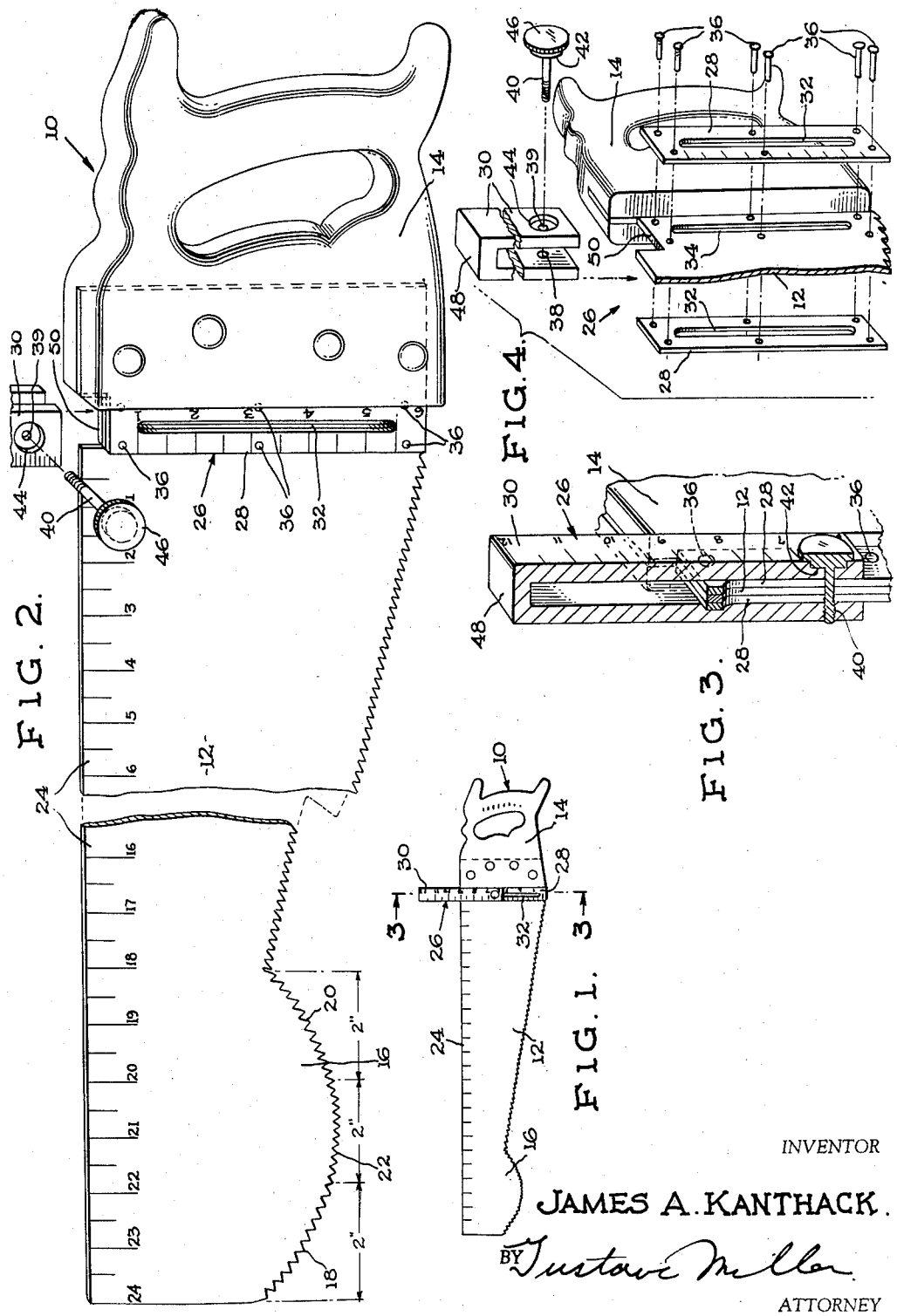

INVENTOR
JAMES A. KANTHACK
BY *Gustav Miller*
ATTORNEY

United States Patent Office 2,853,106
Patented Sept. 23, 1958

2,853,106

CUT THROUGH PORTABLE HANDSAW

James A. Kanthack, Arlington, Wash.

Application May 27, 1957, Serial No. 661,940

3 Claims. (Cl. 145—35)

This invention relates to handsaws, and it particularly relates to handsaws adapted to cut through panels, wall structure or the like from an intermediate point and without the necessity of starting from an edge.

It has heretofore been the general practice, when sawing through the center of a board or panel, to first bore a hole in the board and then apply a keyhole saw. This keyhole saw is a rather crude tool, something like a rasp, which leaves scarred edges and splinters on the material. As a result, it is necessary to sand and smooth the rough edges left by it. After the keyhole saw has provided a sufficient opening, a regular saw is then inserted to make the desired cut.

Because of the difficulties and bother attending the use of keyhole saws, many attempts have been made to provide a device wherein the initial cut can be made by the handsaw itself, or by a portion thereof. Such prior devices have included various arcuate or straight extensions of an ordinary handsaw. However, none of these prior devices were adaptable to the various different types of contours. For example, the arcuate types were limited to the in-line contours of the main portion of the saw so that it was difficult to manipulate them. On the other hand, the saws with straight extensions could not be used on concave surfaces since the saw would be buried in its own cuttings, while, when used on a flat surface, each preceding stroke of the saw tended to shorten the distance of the next stroke. Consequently, the straight or square type had very little utility.

It is, therefore, one object of the present invention to provide a saw device which effectively eliminates the necessity for using a keyhole saw.

Another object of the present invention is to provide a saw device which is adapted to provide an effective initial cut in the center area of a board or the like, regardless of its contour.

Another object of the present invention is to provide a saw device which is a self-contained unit wherein the device not only is adapted to form an initial cut in the center area of a piece of material, and to then saw an opening of any desired size and shape, but is also provided with built-in try-square means, thereby eliminating the necessity of using a separate try-square.

Other objects of the present invention are to provide an improved saw device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings wherein:

Fig. 1 is a small-scale, side elevational view of a combination saw and try-square embodying the present invention.

Fig. 2 is an enlarged, side perspective view, partly broken away and with some of the parts in exploded position, of the device of Fig. 1.

Fig. 3 is a perspective, cross-sectional view taken on line 3—3 of Fig. 1.

Fig. 4 is an exploded view of the removable scale-retaining portion of the try-square assembly.

Figure 5:
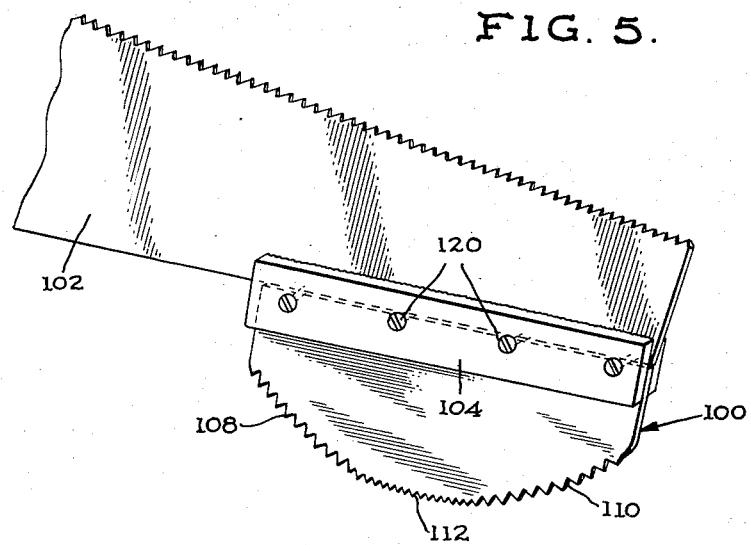
Fig. 5 is a fragmentary perspective view of a second embodiment of the present invention, showing an attachment.

Referring in greater detail to the drawings wherein similar reference characters refer to similar parts, there is shown a saw device, generally designated 10, comprising a blade 12 and a handle 14. The blade, for the major portion of its length, is of the ordinary handsaw type and its teeth may either be of the rip or cross-cut type. At its free end, however, the blade is provided with an arcuate extension 16 which depends down below the level of the adjacent portion of the blade. This arcuate portion is provided with teeth divided into three sections, the teeth of the first section 18 and the third section 20 being of greater dimension and the teeth of the middle section 22 being finer. The entire arcuate toothed edge of the extension 16 is preferably six inches long and each of its sections is preferably two inches long. The teeth in this arcuate extension may be either rip or cross-cut; however, when the teeth are of the rip type, there are five and one-half teeth to the inch in sections 18 and 20 and 10 teeth to the inch in section 22, while when the teeth are of the cross-cut type, there are eight teeth to the inch in sections 18 and 20 and 10 teeth to the inch in section 22.

As will be apparent from an inspection of Figs. 1 and 2, the chord of the arcuate edge of extension 16 is substantially greater than 90°, but is less than 180°, thereby facilitating its operation when cutting a kerf or initiating a cut into a flat wall.

In order to obviate the necessity for using a separate try-square which may easily become misplaced or lost, the saw is provided with a built-in try-square means which includes a scale 24 on the back edge of the blade and an adjustable scale assembly 26 on that portion of the blade which is adjacent the handle.

The scale assembly 26 includes a pair of metal stiffener plates 28, one on each side of the saw blade, and an adjustable scale member 30. The plates 28 are each provided with a longitudinal slot 32 and these slots 32 mate with a similar slot 34 in the blade 12. The plates 28 are held in place on the blade by rivets 36. The plates 28 are provided in order to prevent bending or buckling of the saw blade. In other words, when the scale member 30 is raised to the operative position, as indicated in Fig. 1, it applies a torque to the blade because of the weight of the scale member. If the scale member is not returned to its inoperative position, coincident with the blade of the saw, because of an oversight of the user, when the saw is operated, the torque exerted by the extended scale member would apply a bending stress on the blade in a direction transverse to the direction of motion of the blade. This bending stress is, however, compensated by the metal stiffener plates 28, and no buckling or bending takes place.

The scale member 30 is of bracket construction and each of its arms overlies one of the plates 28 on the opposite sides of the saw blade. An opening 38 of screw threaded construction is provided on the lower end of one of the arms and a corresponding unthreaded opening 39 is provided on the other arm. A set screw 40 is adapted to be inserted through these openings as well as through the slots 32 on the plates 34 in the blade. The threaded end of the set screw engages with the threads in opening 38 to clamp the scale member in any position of longitudinal adjustment relative to the plates. A flange 42 is provided at the unthreaded end of the set screw to seat within a counterbore 44 surrounding the opening 39 and, adjacent this flange, is a knurled knob 46 for operating the set screw.

The top of the scale member 30 is closed by a bridge portion 48 which acts as a stop to limit the downward movement of the scale member. In order to allow for this bridge member while yet maintaining the lines of the saw, a notch 50 is provided in the saw blade above the stiffener plates 28. When the scale member 30 has been drawn down into its fully inoperative position, the bridge member 48 seats snugly in notch 50.

In operation, when it is desired to cut out a section of a wall or the like in order to make a window or other aperture, the extension 16 is applied to the material with the saw in the ordinary sawing position. Since this position is the easiest for the operator, being much more comfortable than other positions, a kerf is quickly and accurately made. The fine teeth in section 22 make the first straight line and the length of the kerf is kept constant throughout its depth by the arcuate sections 18 and 20 which are brought into play by a slight swivelling of the saw at either end of the kerf. Thereafter, the actual sawing by the full blade takes place without shift of position.

When it is desired to gauge the accuracy of the cut, it is merely necessary to extend the scale member 40 to a desired position, tighten the set screw 40 to hold it in place, and then use the scale on the back edge of the saw in cooperation with the scale on the scale member. Then the set screw is again loosened, the scale member retracted and the set screw tightened to hold it in place; after which the saw is again ready for use.

Figure 6:
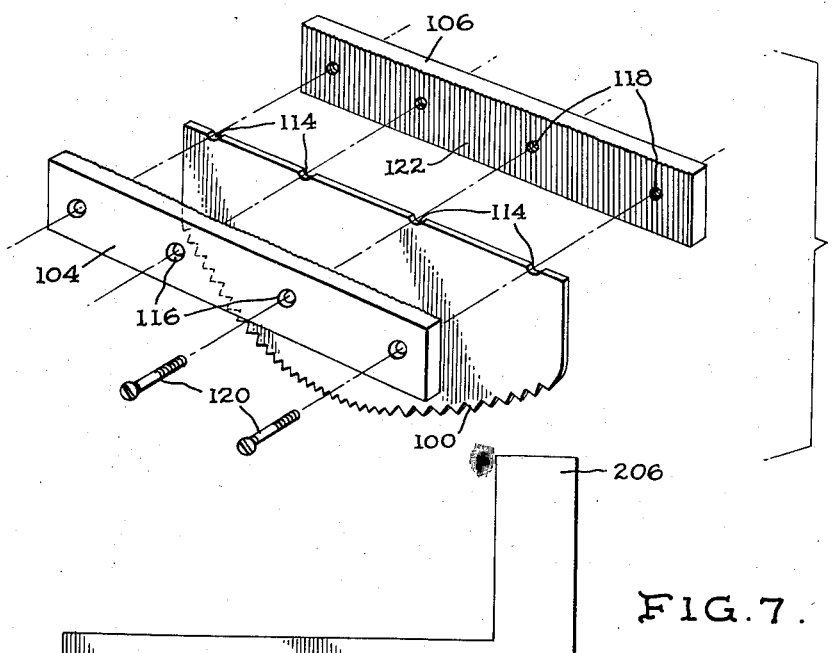
Fig. 6 is a perspective exploded view of the attachment of Fig. 5.

In Figs. 5 and 6 there is shown a modification of the invention wherein the kerf cutting extension can be applied to an ordinary handsaw. The extension here is indicated at 100 and is applied to the back edge of an ordinary saw blade 102, at the forward end thereof, by means of attaching plates 104 and 106.

The extension 100 here takes the form of an arcuate segment having three sections of teeth, 108, 110 and 112. The teeth of section 108 correspond to those of section 18 of the first-described form of the invention, the teeth of section 110 correspond to those of section 20 and the teeth of section 112 correspond to those of section 22. The size and shape of the extension 100 and of its teeth correspond to those of extension 16. In similar manner, the teeth may be either cross-cut or rip type.

The upper edge of the extension 100 is provided with four notches 114 which underlie the back edge of the blade 102. When in this position, the extension is clamped to the blade by placing the attaching plate 104 at one side and the plate 106 at the opposite side with the upper edges of these plates overlapping the back edge of the saw blade, as shown in Fig. 5. The plate 104 is provided with four holes 116 adapted to mate with the notches 114, while the plate 106 is provided with four corresponding screw-threaded holes 118. With the plates in position against the extension 100 and the saw blade 102, screws 120 are inserted through the holes 116 and then through notches 114. They then pass into holes 118 where they are held in screw-threaded engagement to clamp the extension 100 on the saw blade. In order to firmly hold the plates 104 and 106 in place, they are each serrated or knurled on their inner faces, as indicated at 122.

The operation of this form of the device is similar to that described above except that it is necessary to hold the saw in the reversed position while using the extension 100 to form a kerf.

Figure 7:
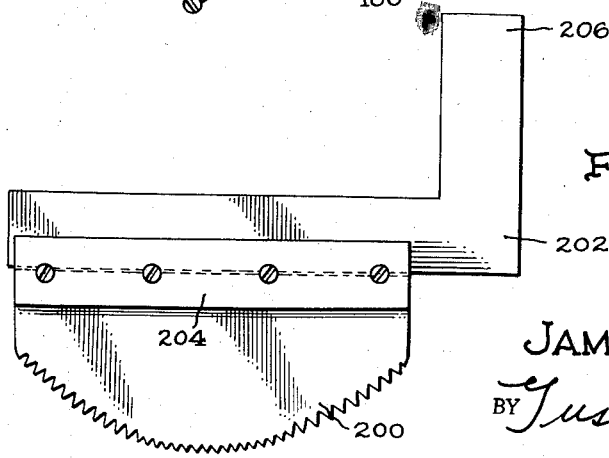
Fig. 7 is a side elevational view of a third embodiment of the present invention.

In Fig. 7, there is illustrated a form of the invention wherein the kerf-forming extension, indicated here at 200, is applied to an ordinary try-square 202. The extension 200 is identical to that shown at 100 and this is also true as between the attachment plates 204 and those shown at 104 and 106. In this form of the invention, however, instead of being able to make the kerf with the same tool as is used to make the complete cut, the kerf is made by the same tool as is used to measure the cut. The arm 206 of the try-square is here used as the handle.

As can be seen, of the three above-described forms of the invention, that shown in Figs. 1 to 4 is capable of kerf-forming, sawing and measuring while the other two forms can perform only two of these three functions. However, the last-two-described forms had the advantage of being adaptable to ordinary tools and are, therefore, less expensive to use.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A saw device comprising a support and a kerf-cutting means on said support, said kerf-cutting means having an arcuate edge provided with saw teeth, said arcuate edge extending forwardly from said support and being divided into three sections, one section at one end, another section at the opposite end and a middle section between said first two sections, the saw teeth of said middle section being relatively fine and the teeth of said two ends being of relatively larger dimension, said support being a handsaw blade integral with said kerf-cutting means, said arcuate edge of said kerf-cutting means being positioned on the front end of and having one end of one end section merging with the toothed edge of said handsaw blade, the chord of said arcuate edge forming an angle with said toothed edge of substantially greater than 90° but less than 180°.

2. A kerf-cutting attachment comprising a blade having a straight edge and an arcuate edge opposite thereto, said arcuate edge being provided with saw teeth and said straight edge having a plurality of spaced notches, a pair of clamping plates having holes corresponding in number and position to the notches of said blade, the holes of one of said plates being smooth and those of the other of said plates being screw-threaded, and screws adapted to be inserted through the smooth holes of said first plates, through the notches in said blade and to be threadedly engaged in said screw-threaded holes to clampingly engage said blade on a support, said clamping plates extending above said straight edge of said blade when in clamping position.

3. The attachment of claim 2 wherein the inner surface of said clamping plates are striated.

References Cited in the file of this patent

UNITED STATES PATENTS

| | | |
|---|---|---|
| 770,094 | McGill | Sept. 13, 1904 |
| 942,920 | Martin | Dec. 14, 1909 |
| 1,641,831 | Shearer | Sept. 6, 1927 |
| 2,542,169 | Wainwright | Feb. 20, 1951 |
| 2,727,545 | Dawson | Dec. 20, 1955 |
| 2,780,256 | Dodd | Feb. 5, 1957 |

FOREIGN PATENTS

| | | |
|---|---|---|
| 741,168 | France | Feb. 8, 1933 |